(12) United States Patent
Kimura et al.

(10) Patent No.: US 8,982,818 B2
(45) Date of Patent: Mar. 17, 2015

(54) WIRELESS COMMUNICATIONS DEVICE AND DATA REDISTRIBUTION METHOD

(75) Inventors: Ryohei Kimura, Tokyo (JP); Takaaki Kishigami, Tokyo (JP); Isamu Yoshii, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 9 days.

(21) Appl. No.: 13/581,687

(22) PCT Filed: Feb. 25, 2011

(86) PCT No.: PCT/JP2011/001127
§ 371 (c)(1),
(2), (4) Date: Aug. 29, 2012

(87) PCT Pub. No.: WO2011/108242
PCT Pub. Date: Sep. 9, 2011

(65) Prior Publication Data
US 2012/0320861 A1 Dec. 20, 2012

(30) Foreign Application Priority Data
Mar. 3, 2010 (JP) ................................. 2010-046773

(51) Int. Cl.
*H04L 5/00* (2006.01)
(52) U.S. Cl.
CPC ............ *H04L 5/0007* (2013.01); *H04L 5/0032* (2013.01); *H04L 5/003* (2013.01); *H04L 5/0048* (2013.01)
USPC .......................................... 370/329; 370/280

(58) Field of Classification Search
None
See application file for complete search history.

(56) References Cited

U.S. PATENT DOCUMENTS

| 5,896,374 | A | * | 4/1999 | Okumura et al. | ............. 370/311 |
| 2002/0080867 | A1 | * | 6/2002 | Abbas et al. | ................... 375/222 |
| 2007/0121742 | A1 | * | 5/2007 | Tamaki et al. | ................ 375/260 |
| 2009/0257516 | A1 | * | 10/2009 | Hsieh et al. | ..................... 375/260 |
| 2010/0128614 | A1 | * | 5/2010 | Kuusela et al. | ............... 370/252 |
| 2010/0208837 | A1 | * | 8/2010 | Vetter et al. | ................... 375/267 |

FOREIGN PATENT DOCUMENTS

| JP | 2007-135021 A | 5/2007 |
| JP | 2010-041252 A | 2/2010 |
| WO | 96/26582 A | 8/1996 |

OTHER PUBLICATIONS

International Search Report for PCT/JP2011/001127 dated Mar. 29, 2011.

* cited by examiner

*Primary Examiner* — Hassan Phillips
*Assistant Examiner* — Ayanah George
(74) *Attorney, Agent, or Firm* — Pearne & Gordon LLP

(57) ABSTRACT

A wireless communications device that transmits a multiplexed signal of a plurality of data sets of different sizes to a communications terminal includes an empty resource block detection section, which detects empty resource blocks of the data sets each of which does not use any of a predetermined number of resource blocks, from among the plurality of data sets whereto the predetermined number of resource blocks are allocated in the time direction and the frequency direction; and a data redistribution section that redistributes a part of data that is distributed in resource blocks, with respect to the data sets whereto resource including empty resource blocks are allocated, in the vicinity of pilot symbols that are disposed within the empty resource blocks. It is possible to effectively utilize the function of all the pilot symbols and improve error rate characteristics.

7 Claims, 14 Drawing Sheets

FIG. 9

| NUMBER OF DISTRIBUTED RESOURCE BLOCKS | NUMBER OF EMPTY RESOURCE BLOCKS | SIGNALING BITS (REDISTRIBUTION PATTERN) |
|---|---|---|
| 1 | ... | ... |
| 2 | 0 | 000 |
| 2 | 1 | 001 |
| 2 | 2 | 010 |
| 2 | 3 | 011 |
| 2 | 4 | 100 |
| 2 | 5 | 101 |
| 2 | 6 | 110 |
| 2 | 7 | 111 |
| 2 | 8 OR MORE | 111 |
| 3 | ... | ... |
| 4 | 0 | 000 |
| 4 | 1 | 000 |
| 4 | 2 | 000 |
| 4 | 3 | 001 |
| 4 | 4 | 010 |
| 4 | 5 | 011 |
| 4 | 6 | 100 |
| 4 | 7 | 101 |
| 4 | 9 | 110 |
| 4 | 10 | 111 |
| 4 | 11 OR MORE | 111 |

FIG. 11

| QUANTIZATION UNIT (EMPTY RB NUMBER) | EMPTY RB NUMBER | SIGNALING BITS (REDISTRIBUTION PATTERN) | USED EMPTY RB NUMBER |
|---|---|---|---|
| 1 | 0 | 000 | 0 |
| 1 | 1 | 001 | 1 |
| 1 | 2 | 010 | 2 |
| 1 | 3 | 011 | 3 |
| 1 | 4 | 100 | 4 |
| 1 | 5 | 101 | 5 |
| 1 | 6 | 110 | 6 |
| 1 | 7 | 111 | 7 |
| 2 | 0~1 | 000 | 0 |
| 2 | 2~3 | 001 | 2 |
| 2 | 4~5 | 010 | 4 |
| 2 | 6~7 | 011 | 6 |
| 2 | 8~9 | 100 | 8 |
| 2 | 10~11 | 101 | 10 |
| 2 | 12~13 | 110 | 12 |
| 2 | 14~15 | 111 | 14 |
| 3 | 0~3 | 000 | 0 |
| 3 | 4~7 | 001 | 4 |
| 3 | 8~11 | 010 | 8 |
| 3 | 12~15 | 011 | 12 |
| 3 | 16~19 | 100 | 16 |
| 3 | 20~23 | 101 | 20 |
| 3 | 24~27 | 110 | 24 |
| 3 | 28~31 | 111 | 27 |
| 4 | ... | ... | ... |

WIRELESS COMMUNICATIONS DEVICE AND DATA REDISTRIBUTION METHOD

TECHNICAL FIELD

The present invention relates to a wireless communications device and a data redistribution method each for transmitting a multiplexed signal of a plurality of different data sets in a spatial multiplexing manner to a communications terminal.

BACKGROUND ART

In each of LTE-A (Long Term Evolution Advanced) standardized in the standards body 3GPP (The 3rd Generation Partnership Project) and IEEE 802.16m (next generation WiMAX) standardized in the IEEE 802.16 Committee, the MU-MIMO (MultiUser-MIMO) system has been considered as the MIMO (Multi Input Multi Output) transmission system of a downlink. The MU-MIMO system is a system where a base station having a plurality of antennas communicates with a plurality of communications terminals (hereinafter merely referred to "terminals") having a plurality of antennas. According to this system, the base station distributes resource to the terminals and transmits different signals to the terminals at respective directivities.

The base station performs the channel adaptive scheduling. The base station performing the channel adaptive scheduling distributes basically the resource in the time direction and the frequency direction in a block unit basis to the terminals in a good channel state. Further, the base station employing the MU-MIMO system also distributes the resource in the spatial direction in addition to the distribution of the resource in the time direction and the frequency direction.

The sizes of data transmitted to the terminals from the base station may differ at the respective terminals. Further, as described above, according to the channel adaptive scheduling, the terminal is selected in accordance with the channel state thereof. Thus, the sizes of the data transmitted to the terminals, each of which is allowed to communicate, do not necessarily coincide to each other. As a result, the resource distributed to the terminal having a small data size contains empty resource blocks each having no actual data.

FIG. 12 is a diagram showing an example of data, distributed to logical resource blocks in the frequency direction, to be transmitted to two terminals from the base station employing the MU-MIMO system. In the example shown in FIG. 12, four VRBs (Virtual Resource Blocks) are allocated to each of the terminal #1 and the terminal #2. VBR is a unit of data distribution in a state before the data distribution as described later. In this example, although the data size of the data to be transmitted to the terminal #1 corresponds to four VBRs, the data size of the data to be transmitted to the terminal #2 corresponds to two VBRs. In this manner, since two VBRs among the four VBRs distributed to the terminal #2 contain no actual data, there arises empty resource blocks within the resource. In this specification, it is supposed that data to be transmitted to terminals other than the terminals #1 and #2 is not distributed to the empty resource blocks.

FIGS. 13(a) and (b) are diagrams showing an example of data, to be transmitted to the respective terminals, each distributed to PRBs (Physical Resource Blocks) in the time direction and the frequency direction. FIG. 13(a) shows the data to be transmitted to the terminal #1 and FIG. 13(b) shows the data to be transmitted to the terminal #2. As shown in FIGS. 13(a) and (b), the data distributed to the respective VRBs of each of the respective terminals is disposed on the corresponding PRBs in one-to-one correspondence with the VRBs in the frequency direction at every terminal. PRB is a unit of data distribution in a state after the data distribution as described later, and configured by a plurality of resource blocks in the time direction and the frequency direction. For example, as shown in FIG. 13(b), the PRB is configured by 18 subcarriers in the frequency direction and 6 symbols in the time direction. Further, when the data is distributed on the PRBs, the pilot symbols are inserted at different positions for the respective terminals.

In the wireless mobile communications, the signal waveform is distorted due to the influence of the multipath fading on a propagation channel (hereinafter merely referred to "channel"). The signal transmitted to the terminals from the base station is also distorted. In order for the terminal to correctly decode the signal transmitted from the base station, the terminal is required to estimate the channel and compensate the signal. For the channel estimation, the base station transmits the pilot symbols known for both the base station and the terminals. A plurality of the pilot symbols are disposed within each of the PRBs at a constant interval in the time direction or the frequency direction.

FIG. 14 is a diagram showing an example of multiplexed data of the data for the respective terminals shown in FIGS. 13(a) and (b). As shown in FIG. 14, the pilot symbols of the respective terminals to be multiplexed are disposed at the constant interval in the time direction or the frequency direction. The channel estimation is a processing in which a channel variation degree estimated by using the pilot symbols is subjected to an interpolation processing such as a weighting or averaging processing, and the channel of the data existing between the pilot symbols is estimated at every resource element (Resource Element: RE) shown in FIG. 14.

The technique disclosed in a patent literature 1 does not employ the MIMO system and is based on the communications with a single terminal. Further, the patent literature 1 has no disclosure relating to the empty resource blocks.

CITATION LIST

Patent Literature

Patent Literature 1: JP-A-2007-135021

SUMMARY OF INVENTION

Technical Problem

The accuracy of the channel estimation performed on the terminal side is better as to the data of the resource element closer to the pilot symbol both in the time direction and the frequency direction. In other words, the accuracy of the channel estimation further degrades as the data of the resource element becomes farther from the pilot symbol. As shown in FIGS. 13(a), (b) and FIG. 14, the pilot symbols are inserted into all the PRBs whether the data is distributed to the PRBs or not. In the example shown in FIG. 13(b), although data is not distributed to the two PRBs (empty resource blocks) on the right side, the pilot symbols are disposed at the constant intervals in the both directions of the frequency. However, no data to be transmitted to the terminal #2 is allocated in the vicinity of the pilot symbols inserted into the two PRBs on the right side. Thus, a part of the pilot symbols are not used effectively. That is, opportunities of utilizing the function of the pilot symbols are partially lost.

An object of this invention is to provide a wireless communications device and a data redistribution method which can sufficiently utilize the function of all pilot symbols and improve error rate characteristics.

Solution to Problem

This invention provides a wireless communications device that transmits a multiplexed signal of a plurality of data sets of different sizes to a communications terminal, including: an empty resource block detection section that detects empty resource blocks of the data sets each of which does not use any of a predetermined number of resource blocks, from among the plurality of data sets to which the predetermined number of resource blocks are allocated in a time direction and a frequency direction, and a data redistribution section that redistributes a part of data that is distributed in resource blocks, with respect to the data sets to which resource including empty resource blocks are allocated, in vicinity of pilot symbols that are disposed within the empty resource blocks.

This invention provides a data redistribution method performed by a wireless communications device that transmits a multiplexed signal of a plurality of data sets of different sizes to a communications terminal, including: detecting empty resource blocks of the data sets each of which does not use any of a predetermined number of resource blocks, from among the plurality of data sets to which the predetermined number of resource blocks are allocated in a time direction and a frequency direction, and redistributing a part of data that is distributed in resource blocks, with respect to the data sets to which resource including empty resource blocks are allocated, in vicinity of pilot symbols that are disposed within the empty resource blocks.

Advantageous Effects of Invention

According to the wireless communications device and the data redistribution method of this invention, the function of all the pilot symbols can be utilized sufficiently and the error rate characteristics can be improved.

BRIEF DESCRIPTION OF DRAWINGS

FIGS. 5(a) and 5(b) are diagrams showing another example of data, to be transmitted to the respective terminals, that is distributed to the PRBs in which data has been redistributed, in which FIG. 5(a) is the data to be transmitted to a terminal #1 and FIG. 5(b) is the data to be transmitted to a terminal #2.

FIG. 9 is a diagram showing a relation between the number of distributed resource blocks, the number of empty resource blocks and signaling bits representing a redistribution pattern, in a case where the upper limit of the signaling bits is set to 3.

FIGS. 10(a) and 10(b) show a relation between the empty RB number and granularity in a case where the upper limit of the number of the signaling bits is 3, in which FIG. 10(a) is a conceptual diagram at the time of quantizing 8 empty RBs by the granularity 1 and (b) is a conceptual diagram at the time of quantizing 16 empty RBs by the granularity 2.

FIG. 11 is a diagram showing a relation between the RB number and the empty RB number of the terminal #2 and the signaling bits representing the redistribution pattern.

DESCRIPTION OF EMBODIMENTS

Embodiments of this invention will be explained with reference to drawings. The communications system explained below is configured by a base station having a plurality of antennas and a plurality of communications terminals (hereinafter merely referred to "terminals") having a plurality of antennas, and employs the MU-MIMO (MultiUser-MIMO) system as the transmission system of a downlink. Thus, the base station distributes resource in the spatial direction as well as the time direction and the frequency direction in a block unit basis to the terminals in a good channel state, and transmits different signals to the terminals for respective directivities.

The multiplex number in this communications system is 2. In the embodiments explained bellow, the signal to be transmitted to the terminals from the base station is configured by multiplexing data to be transmitted to the terminal #1 and data to be transmitted to the terminal #2. In this respect, the size of the data to be transmitted to the terminal #2 is smaller than the size of the data to be transmitted to the terminal #1.

(First Embodiment)

Figure 1:
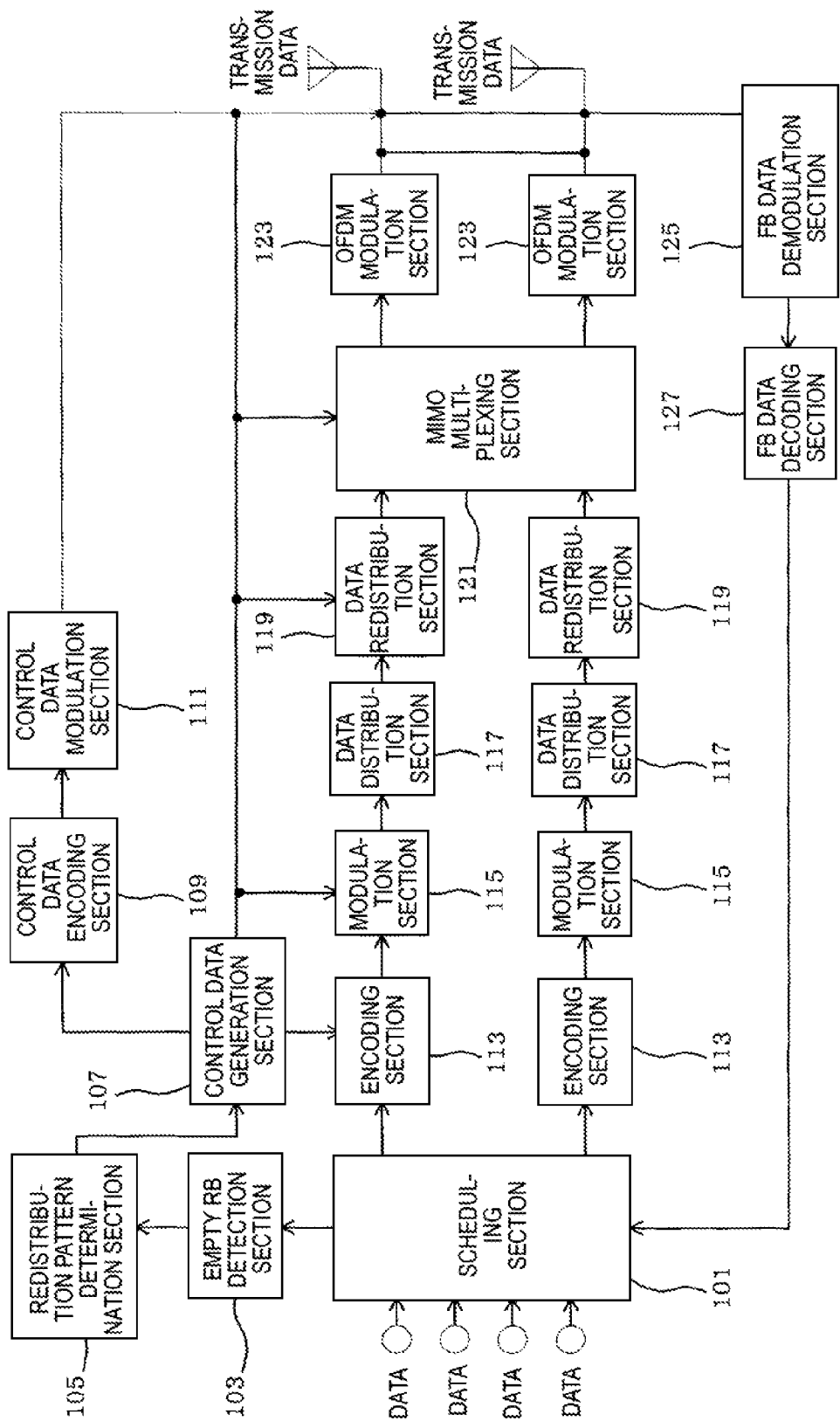
FIG. 1 is a block diagram showing the configuration of a base station according to the first embodiment.

FIG. 1 is a block diagram showing the configuration of the base station according to the first embodiment. As shown in FIG. 1, the base station according to the first embodiment includes a scheduling section 101, an empty resource block detection section (empty RB detection section) 103, a redistribution pattern determination section 105, a control data generation section 107, a control data encoding section 109, a control data modulation section 111, an encoding section 113, a modulation section 115, a data distribution section 117, a data redistribution section 119, a MIMO multiplexing section 121, an OFOM modulation section 123, a feedback data demodulation section (FB data demodulation section) 125 and a feedback data decoding section (FB data decoding section) 127.

The scheduling section 101 selects the terminals to which the base station transmits data, based on CQI (Channel Quality Information) contained in feedback data transmitted from the respective terminals. The scheduling section 101 performs the channel adaptive scheduling for allocating communications opportunities to the terminals having good SINR (Signal to Interference and Noise power Ratio) characteristics of the channels. The empty RB detection section 103 compares the sizes of the data to be transmitted to the respective terminals to each other to thereby detect the number of the empty resource blocks (empty RBs) of each of the terminals. The empty resource block is a resource block having no actual data.

The redistribution pattern determination section 105 determines a pattern (redistribution pattern) at the time of redistributing the data distributed on the PRBs (Physical Resource Blocks), based on the number of the resource blocks allocated to the terminal #2 and the number of the empty resource blocks of the terminal #2. As the data to be redistributed at the redistribution pattern determination section 105, the data of the resource elements is selected preferentially in the order of the data most away from the pilot symbol in the time direction and the frequency direction.

Figure 2:
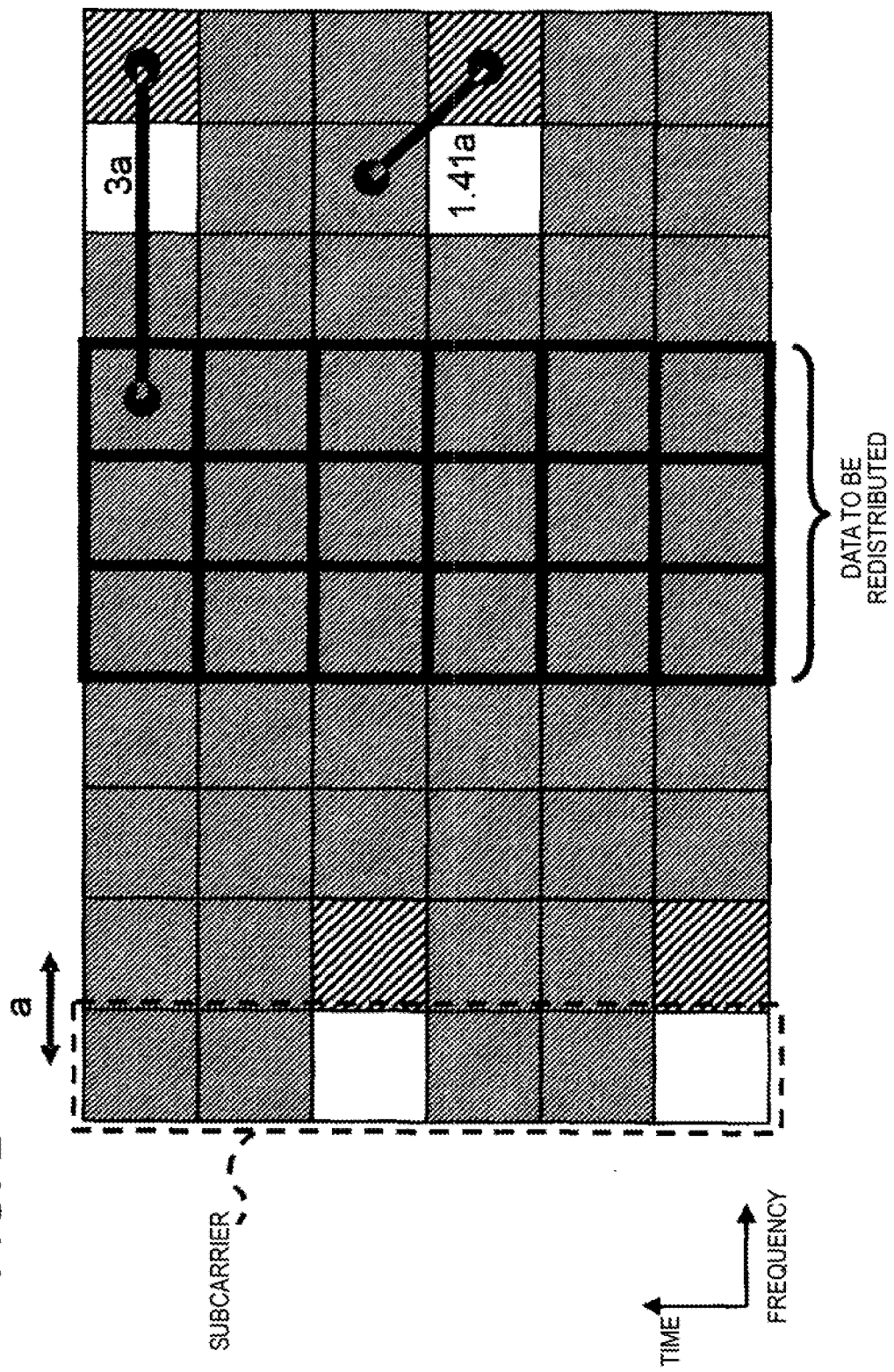
FIG. 2 is a diagram showing a method of selecting data to be redistributed.

FIG. 2 is a diagram showing a method of selecting the data to be redistributed. In the example shown in FIG. 2, an interval between the adjacent subcarriers is shown by a symbol a. In the example shown in FIG. 2, when a resource element away from the pilot symbol by a distance 3a is compared with a resource element away from the same pilot symbol by a distance 1.41a is compared, the former resource element away by the distance 3a is selected preferentially as the data to be redistributed.

The redistribution pattern determination section 105 may select the data to be redistributed not depending on the distances in both the time direction and the frequency direction but depending on the channel variation state in the time direction or the frequency direction. For example, when the channel variation in the frequency direction is larger than the channel variation in the time direction, the redistribution pattern determination section 105 preferentially selects the data of the resource element in the order of that most away from the pilot symbol in the frequency direction. In contrast, when the channel variation in the time direction is larger than the channel variation in the frequency direction, the redistribution pattern determination section 105 preferentially selects the data of the resource element in the order of that most away from the pilot symbol in the time direction.

As an index at the time of selecting the data to be redistributed, a channel correlation value between the subcarriers may be used. In this case, data disposed at the subcarrier having a small channel correlation value, with respect to the subcarrier where the pilot symbol is disposed, is selected preferentially.

As explained above, the redistribution pattern differs depending on the relation between the number of the resource blocks and the number of the empty resource blocks. Thus, the redistribution pattern determination section 105 stores the redistribution patterns corresponding to the respective relations in a memory as a table.

The control data generation section 107 generates control data which is configured by the CQI of the terminals having been scheduled, the layer (information relating to the data multiplexed number of MIMO: "2" in this embodiment), the MIMO transmission weight and the redistribution patterns etc. The encoding section 113 executes the error correction encoding in accordance with a code rate inputted from the control data generation section 107. The modulation section 115 subjects the coded data to the digital modulation in accordance with a modulation level inputted from the control data generation section 107.

The data distribution section 117 distributes the modulated data and the pilot symbols for estimating the channel with a constant interval in the time direction or the frequency direction, within each of the PRBs respectively corresponding to VRBs (Virtual Resource Blocks) in the frequency direction. The data redistribution section 119 redistributes a part of the actual data to be transmitted to the terminal #2 in the vicinity of the pilot symbols within the empty resource blocks, in accordance with the redistribution pattern inputted from the redistribution pattern determination section 105. The data redistribution section 119 does not perform the redistribution processing with respect to the actual data to be transmitted to the terminal #1. The redistribution processing performed by the data redistribution section 119 will be explained later in detail.

The MIMO multiplexing section 121 performs the multiplexing in a manner that the data to be transmitted to each of the terminals is multiplied by the MIMO transmission weight and the respective multiplied data are added to thereby perform the multiplexing. The OFDM modulation section 123 subjects the multiplexed data to the inverse fast Fourier transform to thereby generate an OFDM (Orthogonal Frequency Division Multiplexing) modulated signal. The OFDM modulated signal is transmitted to the terminals as transmission data from antennas.

The control data encoding section 109 encodes the control data generated by the control data generation section 107 with a predetermined code rate. The control data modulation section 111 subjects the coded control data to the digital modulation with a predetermined modulation level. The coded control data thus modulated is transmitted to the terminals at individual control channels, respectively.

The FB data demodulation section 125 demodulates received feedback data. The FB data decoding section 127 decodes the feedback data thus demodulated to thereby extract the CQI of each of the terminals.

Figure 3:
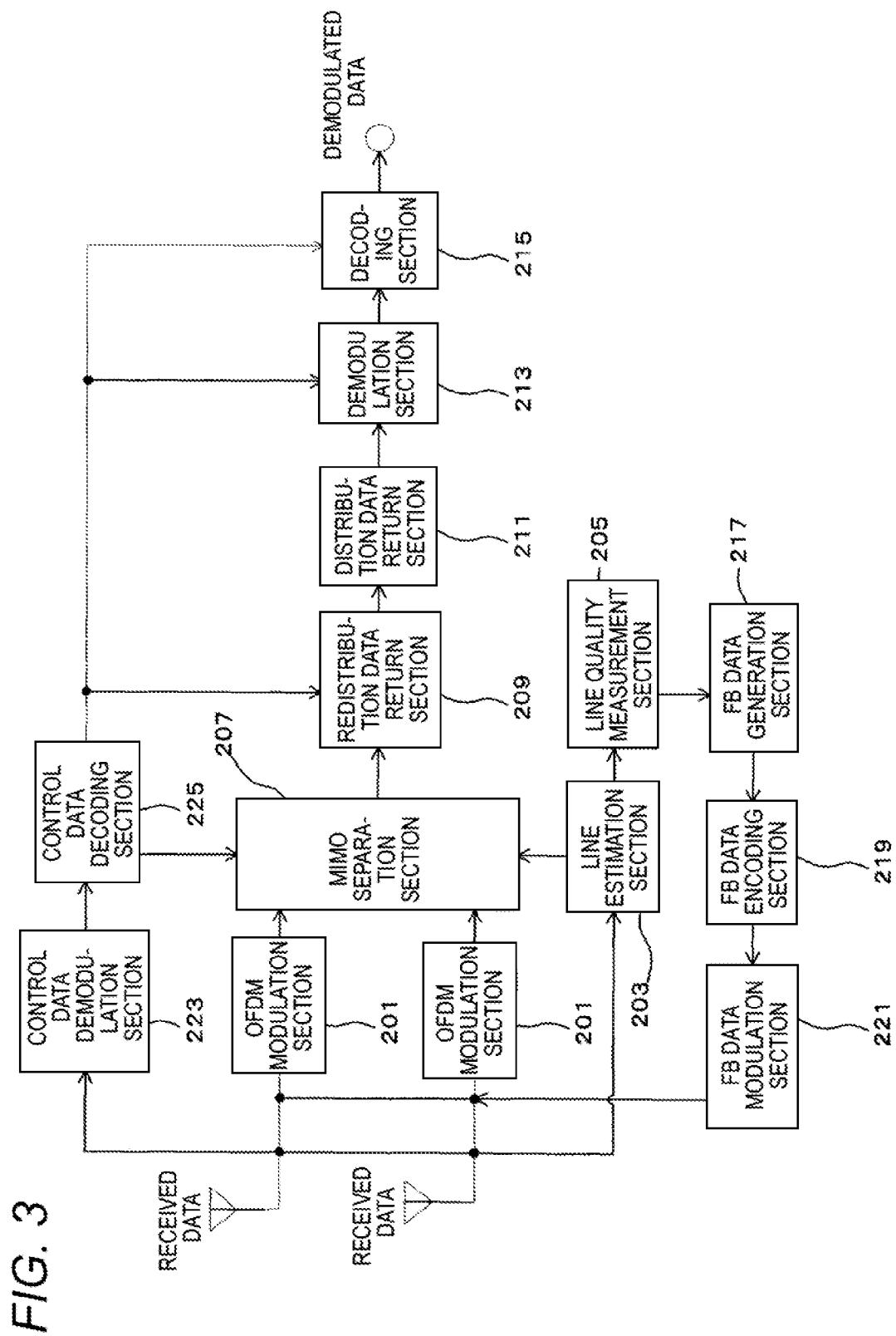
FIG. 3 is a block diagram showing the configuration of a terminal according to the first embodiment.

FIG. 3 is a block diagram showing the configuration of the terminal according to the first embodiment. As shown in FIG. 3, the terminal of the first embodiment includes an OFDM modulation section 201, a line estimation section 203, a line quality measurement section 205, an MIMO separation section 207, a redistribution data return section 209, a distribution data return section 211, a demodulation section 213, a decoding section 215, a feedback data generation section (FB data generation section) 217, a feedback data encoding section (FB data encoding section) 219, a feedback data modulation section (FB data modulation section) 221, a control data demodulation section 223 and a control data decoding section 225.

The OFDM modulation section 201 subjects the received data to the fast Fourier transform to thereby output MIMO data in which the received data is converted on a subcarrier unit basis. The line estimation section 203 estimates the propagation channel of this terminal by using the pilot symbols. The line quality measurement section 205 estimates an average SINR by using the pilot symbols.

The MIMO separation section 207 multiplies the MIMO data outputted from the OFDM modulation section 201 by the MIMO transmission weight same as that of the base station or adds the MIMO transmission weight to the MIMO data to thereby separate the modulation data. The MIMO transmission weight is inputted from the control data decoding section 225. The redistribution data return section 209 returns a part of the redistributed data of the terminal #2 to the original positions, in accordance with the redistributed pattern inputted from the control data decoding section 225. Since the data of the terminal #1 is not redistributed, the redistribution data return section 209 does not perform the redistribution returning processing with respect to the data of the terminal; #1. The distribution data return section 211 extracts the data disposed on the PRBs.

The demodulation section 213 subjects the data extracted by the distribution data return section 211 to the digital modulation to convert into coded data. The decoding section 215 performs the error correction decoding to decode the coded data.

The FB data generation section 217 determines, based on the average SINR obtained by the line quality measurement section 205, control data configured by information such as the CQI of this terminal and the MIMO transmission weight. The FB data encoding section 219 encodes the control data generated by the FB data generation section 217 with a predetermined code rate. The FB data modulation section 221 subjects the coded control data to the digital modulation with a predetermined modulation level.

The control data demodulation section 223 demodulates the received control data. The control data decoding section 225 decodes the received control data thus demodulated.

Hereinafter, the explanation will be made in detail as to the data redistribution performed by the data redistribution section 119 of the base station shown in FIG. 1. Like the example shown in FIG. 12, the explanation will be made as to a case that the size of the data to be transmitted to the terminal #1 corresponds to 4 VBRs and the size of the data to be transmitted to the terminal #2 corresponds to 2 VBRs.

Figure 4:
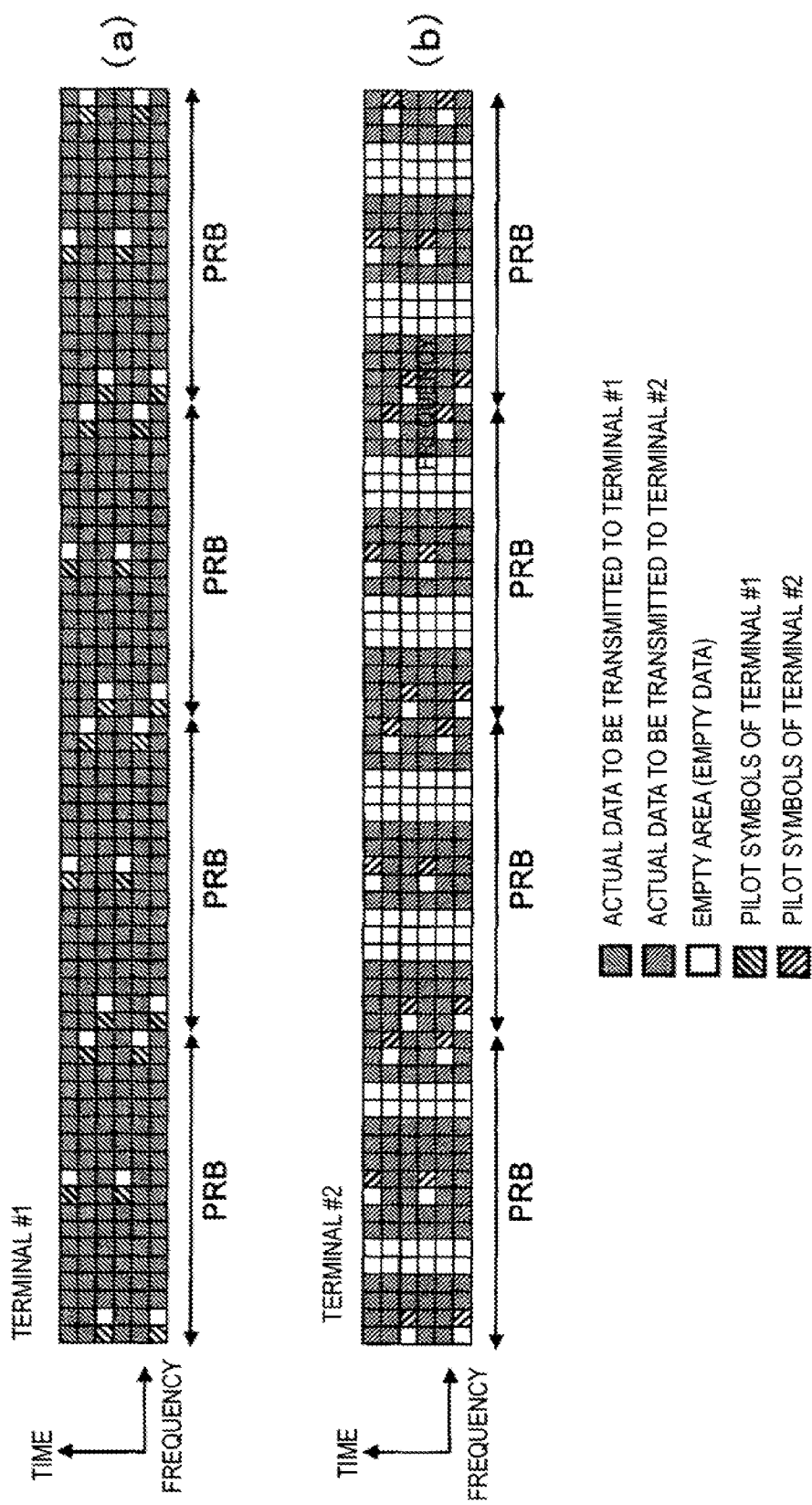
FIGS. 4(a) and 4(b) are diagrams showing an example of data, to be transmitted to the respective terminals, that is distributed to PRBs in which data has been redistributed.
Figure 12:
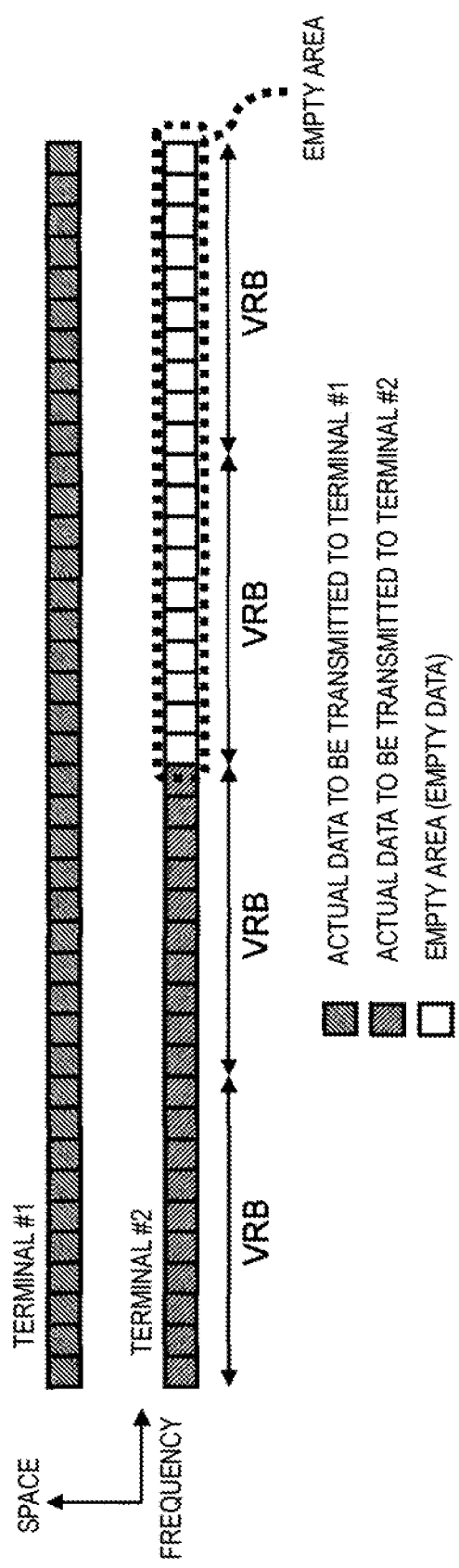
FIG. 12 is a diagram showing an example of data, distributed to logical resource blocks in a frequency direction, to be transmitted to two terminals from the base station employing the MU-MIMO system.
Figure 13:
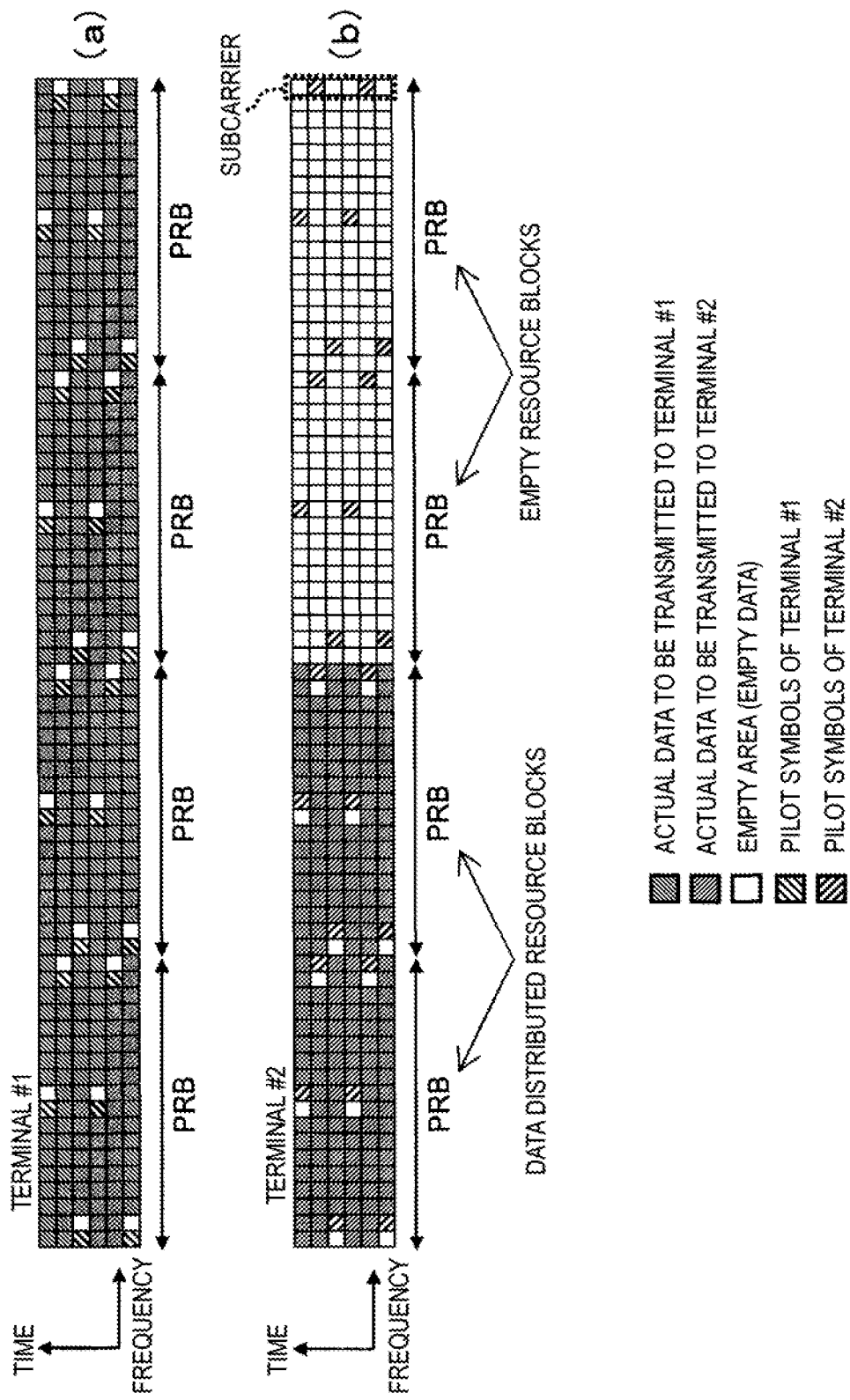
FIGS. 13(a) and (b) are diagrams showing an example of data, to be transmitted to the respective terminals, each distributed to the PRBs in a time direction and the frequency direction, in which FIG. 13 (a) shows the data to be transmitted to the terminal #1 and FIG. 13 (b) shows the data to be transmitted to the terminal #2.

The data distribution section 117 distributes the data allocated to the VRBs shown in FIG. 12 to the PRBs in one-to-one correspondence with the VRBs in the frequency direction, as shown in FIGS. 13(a) and 13(b). The data redistribution section 119 redistributes a part of the actual data, to be transmitted to the terminal #2 among the data shown in FIGS. 13(a) and 13(b), to the empty resource blocks. FIGS. 4(a) and 4(b) are diagrams showing an example of the data, to be transmitted to the respective terminals, that are allocated to the PRBs in which data has been redistributed. FIG. 4(a) shows the data, having not been redistributed, to be transmitted to the terminal #1. FIG. 4(b) shows the data, having been redistributed, to be transmitted to the terminal #2.

As shown in FIG. 4(b), the data redistribution section 119 redistributes a part of the actual data in the vicinity of the pilot symbols within the empty resource blocks shown in FIG. 13(b). As described above, the data redistribution section 119 performs this redistribution in accordance with the redistribution pattern inputted from the redistribution pattern determination section 105. The redistribution pattern determination section 105 determines the pattern redistribution pattern) at the time where the data redistribution section 119 redistributes the data, based on the number of the allocated resource blocks and the number of the empty blocks.

Figure 5:
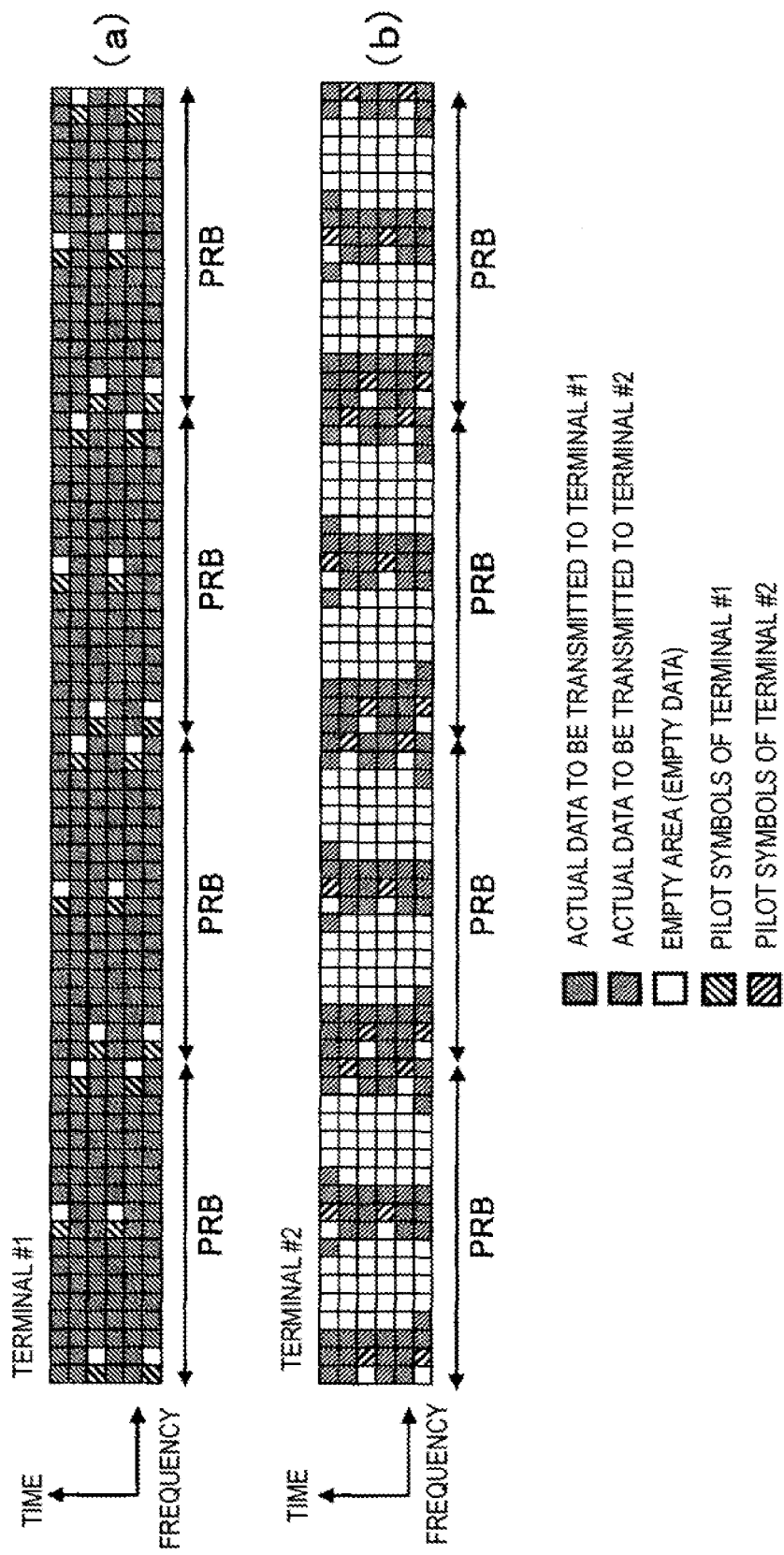

The redistribution pattern differs depending on the relation between the number of the allocated resource blocks and the number of the empty blocks. In the case where there is two empty blocks with respect to four resource blocks, the redistribution is performed to FIG. 4(b) from FIG. 13(b) as shown previously. Further, in the case where there is three empty resource blocks with respect to four resource blocks, the redistribution is performed to FIG. 5(b) from FIG. 13(b) as shown previously. FIGS. 5(a) and 5(b) are diagrams showing another example of the data, to be transmitted to the respective terminals, that is distributed to the PRBs in which data has been-redistributed. FIG. 5(a) shows the data, having not been redistributed, to be transmitted to the terminal #1. FIG. 5(b) shows the data, having been redistributed, to be transmitted to the terminal #2.

As explained above, in this embodiment, when the empty resource block is contained within the allocated resource blocks, a part of the actual data is redistributed in the vicinity of the pilot symbols within the empty resource block. Thus, in the terminal to which this actual data is transmitted, the all the pilot symbols inserted into the allocated resource blocks are effectively used for the estimation of the propagation channel of this terminal. As a result, the average SINR characteristics of the channel of the terminal #2 are improved and the error rate characteristics are improved. Further, since the SINR characteristics of the terminal #1 are equalized, the error rate characteristics of the terminal #1 is improved.

Hereinafter, the reason why the error rate characteristics of the terminal #2 are improved will be explained. The more the data is distributed in the vicinity of the pilot symbols among the data transmitted to the terminal, the further the channel estimation accuracy is improved. The further the channel estimation accuracy is improved and also the further the degree of the interference from the multiplexed channel of the other terminal reduces, the further the SINR is improved (SINR c channel estimation accuracy/interference from multiplexed channel of the other terminal). Thus, the average SINR characteristics of the terminal #2 are improved to a large extent. Accordingly, the error rate characteristics of the channel of the terminal #2 are improved. Further, the error rate characteristics can be expected to be improved due to the interleave effects. The more the number of the empty resource blocks is, the actual data to be redistributed is distributed in the vicinity of the pilot symbols. As a result, the more the number of the empty resource blocks is, the further the channel estimation accuracy is improved and the average SINR characteristics are improved.

Figure 6:
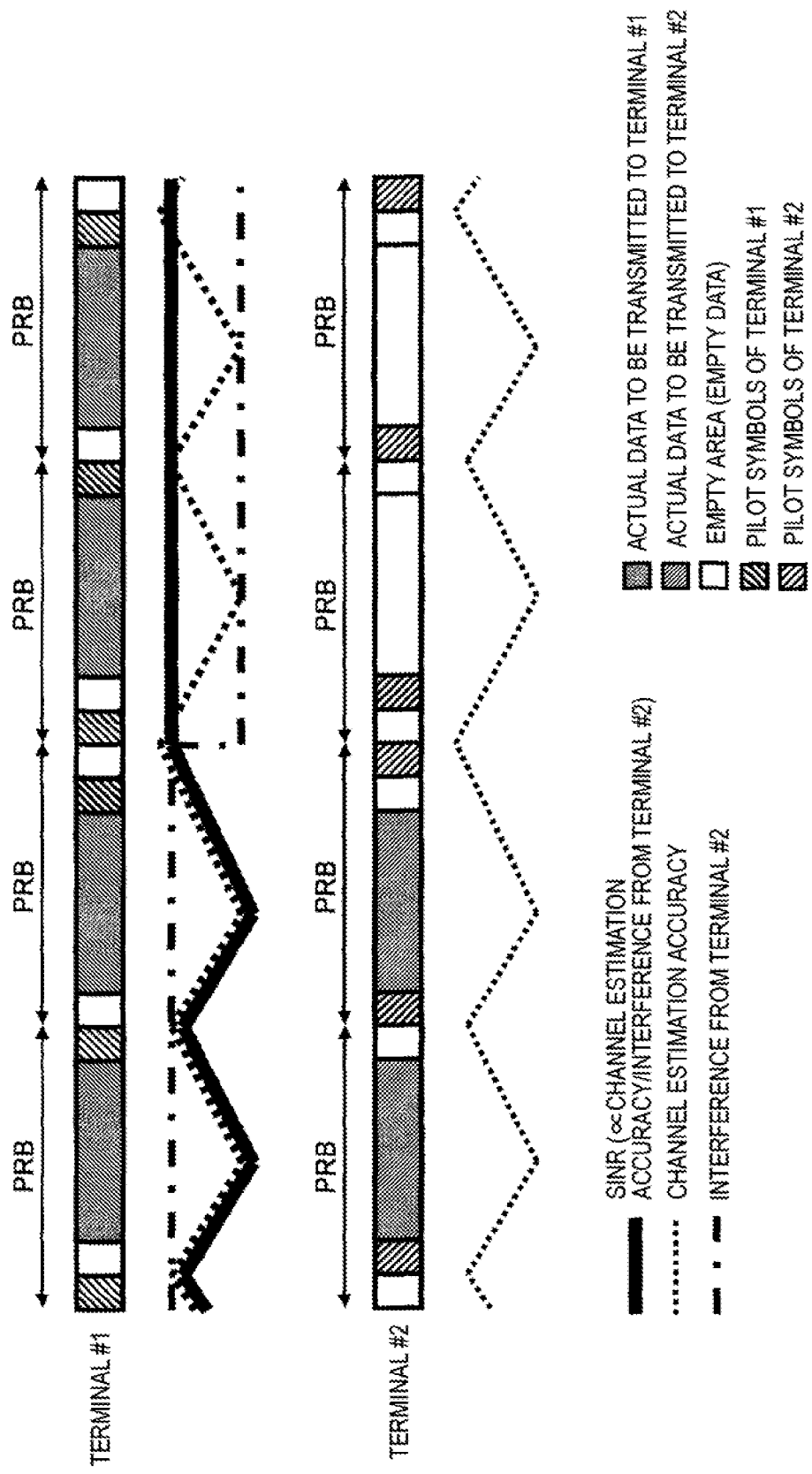
FIG. 6 is a diagram showing the estimation accuracy of respective channels, the interference in the channel of the terminal #1 from the channel of the terminal #2 and the SINR distribution of the terminal #1, in an example shown in FIGS. 13(a) and 13(b) where the data redistribution is not performed.

Next, the reason why the error rate characteristics of the terminal #1 are improved will be explained. First, the explanation will be made as to the average SINR in a case where the data redistribution is not performed. FIG. 6 is a diagram showing the estimation accuracy of the respective channels, the interference in the channel of the terminal #1 from the channel of the terminal #2 and the SINR distribution of the terminal #1, in the example shown in FIGS. 13(a) and (b) where the data redistribution is not performed. As shown by dotted lines in FIG. 6, the estimation accuracy of each of the channels becomes high in the vicinity of each of the pilot symbols inserted in the PRB of each of the terminals and reduces according to the distance away from each of the pilot symbols. Further, as shown by an alternate long and short dash line, a value representing the degree of the interference in the channel of the terminal #1 from the channel of the terminal #2 is high at the PRBs corresponding to the data distributed resource blocks of the terminal #2 and low at the PRBs corresponding to the empty resource blocks thereof. As a result, the SINR of the terminal #1 represents values according to the channel estimation accuracy at the PRBs corresponding to the data distributed resource blocks of the terminal #2 and represents a constant value irrespective to the channel estimation accuracy at the PRBs corresponding to the empty resource blocks thereof. In this manner, when the sizes of the data transmitted to the respective terminals differ therebetween and the allocated PRBs are polarized in the data distributed resource blocks and the empty resource blocks, the distribution characteristics of the SINR differs depending on the resource blocks.

Figure 7:
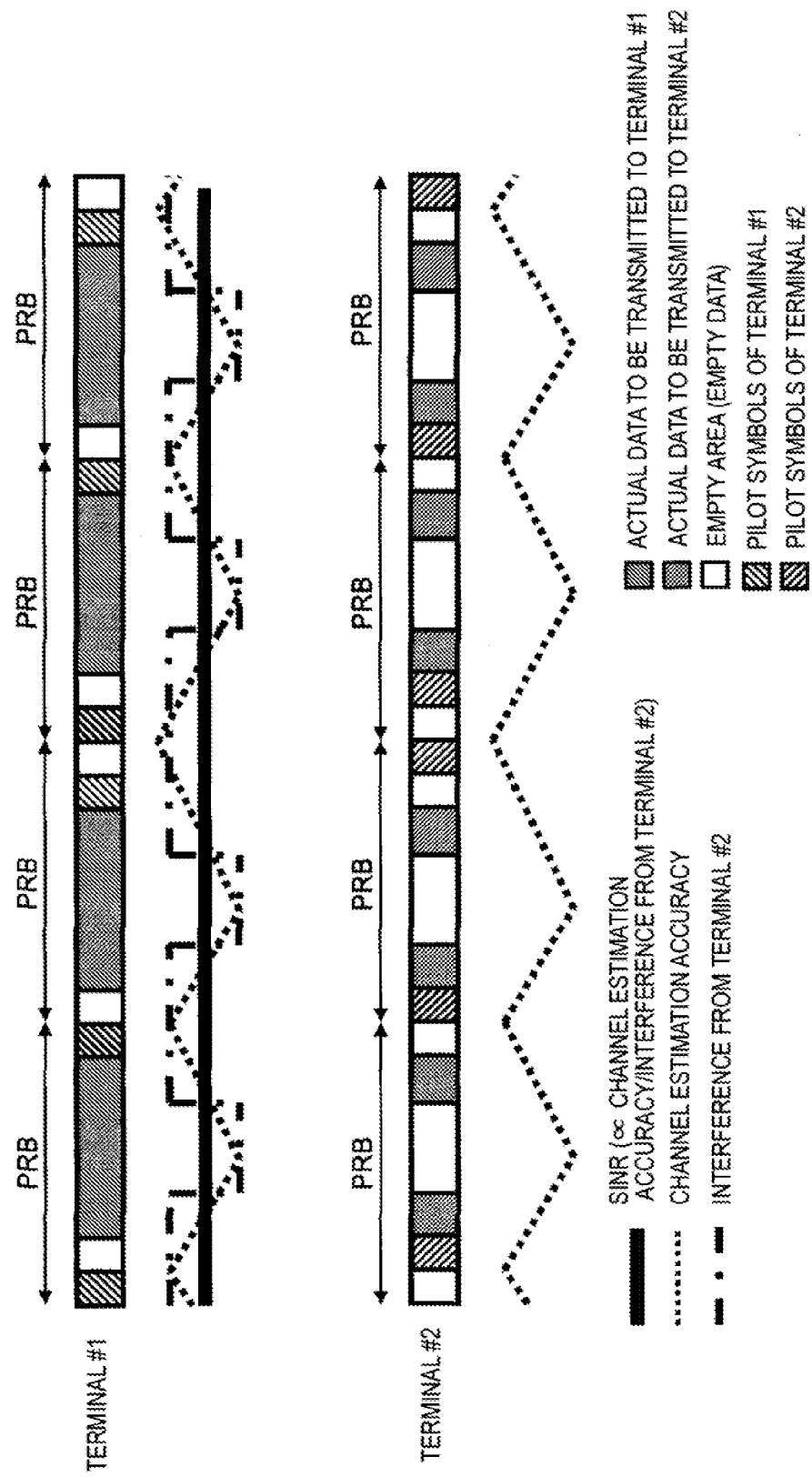
FIG. 7 is a diagram showing the estimation accuracy of the respective channels, the interference in the channel of the terminal #1 from the channel of the terminal #2 and the SINR distribution of the terminal #1, in an example shown in FIG. 14.
Figure 14:
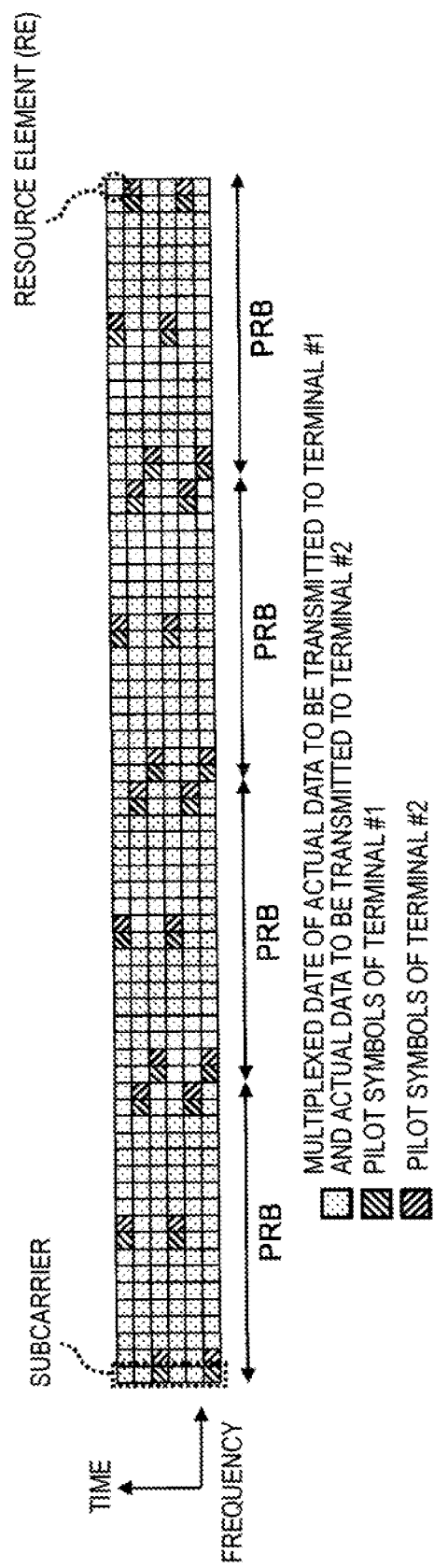
FIG. 14 is a diagram showing an example of multiplexed data of the data for the respective terminals shown in FIGS. 13(a) and 13(b).

On the other hand, FIG. 7 is a diagram showing the estimation accuracy of the respective channels, the interference in the channel of the terminal #1 from the channel of the terminal #2 and the SINR distribution of the terminal #1, in the example shown in FIG. 14 where the data redistribution is performed. In the channel of the terminal #2, the actual data is not distributed to the resource elements which are away from the pilot symbols and have low channel estimation accuracy. Thus, each of the resource elements at the corresponding positions in the channel of the terminal #1 is not influenced from the channel of the terminal #2. On the other hand, each of the resource elements close to the pilot symbols is interfered. As a result, in the example shown in FIG. 6, the SINR of each of the resource elements away from the pilot symbols and having relatively bad SINRs is improved. Further, in the example shown in FIG. 6, the SINR of each of the resource elements close to the pilot symbols and having relatively good SINRs is degraded. Thus, as shown by a bold line in FIG. 7, the SINR distribution of the terminal #1 is equalized.

Incidentally, as the error correction code in the encoding section 113, the random error correction code such as the turbo code may be employed. The further the SINR of the data inputted into a turbo decoder is equalized, that is, close to the normal distribution, the further the coding gain can be improved. Thus, the error rate characteristics of the channel of the terminal #1 can be improved.

(Second Embodiment)

The redistribution pattern determination section 105 provided at the base station shown in FIG. 1 determines the redistribution pattern based on the number of the resource blocks (hereinafter merely referred to "RB number") allocated to the terminal #2 and the number of the empty resource blocks (hereinafter merely referred to "empty RB number") of the terminal #2. The kind of the redistribution pattern is represented by a predetermined number of signaling bits. When the empty RB number becomes large, since the kinds of the redistribution pattern increases, the number of the signaling bits also increases. The data representing the kinds of the distribution pattern is transmitted to the terminal #2 from the base station as a part of the control data. Thus, when the number of the signaling bits representing the kinds of the distribution pattern becomes large, an electric power required for transmitting the control data increases. In other words, when the number of the signaling bits increases, the electric power loss increases and hence the average SINR characteristics degrade.

Figure 8:
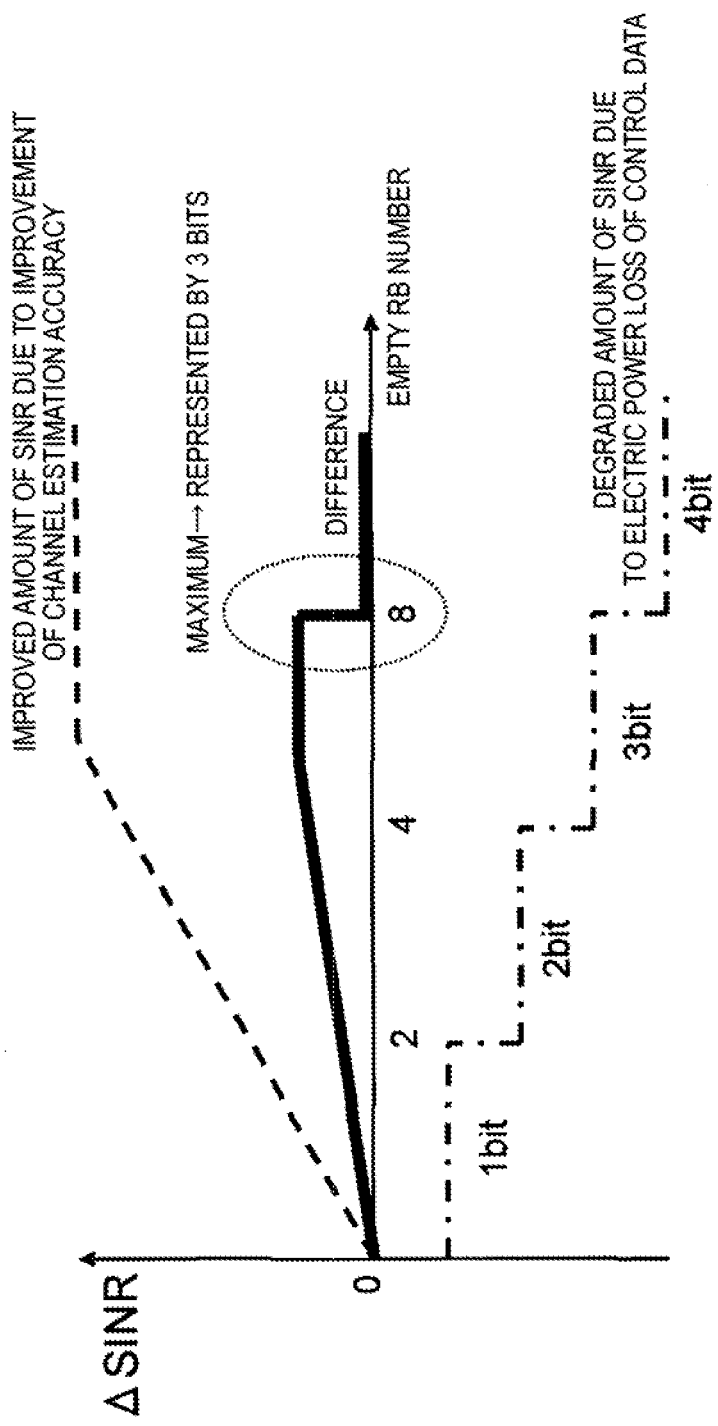
FIG. 8 is a graph showing the influence on SINR due to the channel estimation accuracy and the electric power loss of control data, each according to the empty RB number of the terminal #2.

On the other hand, when the empty RB number becomes large, the data disposed in the vicinity of the pilot symbols increases. Thus, as explained in the first embodiment, the channel estimation accuracy is improved when the empty RB number becomes large. As a result, the average SINR characteristics are improved and the error rate characteristics is improved. FIG. 8 is a graph showing the influence on the average SINR due to the channel estimation accuracy and the electric power loss of the control data, each according to the empty RB number of the terminal #2. As shown in FIG. 8, although an improved amount of the average SINR due to the improvement of the channel estimation accuracy increases to a constant value according to the increase of the empty RB number, the improved amount becomes constant when the empty RB number becomes a predetermined number or more.

Thus, in the second embodiment, an optimum empty RB number, at which a difference between the improved gain and the degraded gain of the average SINR characteristics due to the increase of the empty RB number becomes maximum in the improved direction, is set. According to the example shown in FIG. 8, it will be understood that the increase of the improved amount of the average SINR characteristics due to the increase of the channel estimation accuracy can not be expected when the empty RB number is 8 or more. Thus, when the upper limit of the signaling bits representing the redistribution patterns is set to 3 bits, the electric power loss due to the increase of the number of the signaling bits can be suppressed and the average SINR characteristics can be improved. As the upper limit of the signaling bits, a value (power of two) determined at every system is used.

FIG. 9 is a diagram showing a relation between the number of the allocated resource blocks, the number of the empty resource blocks and the signaling bits representing the redistribution pattern, in a case where the upper limit of the signaling bits is set to 3. As shown in FIG. 9, even when the number of the empty resource blocks is 9 or more in fact, the redistribution pattern is represented by the signaling bits in the case where the empty RB number is 8.

(Third Embodiment)

When the granularity of the signaling bits representing the redistribution pattern explained in the second embodiment is made constant, the number of the signaling bits increases according to the increase of the empty RB number. The granularity of the signaling bits corresponds to a unit (quantization unit) at the time of quantizing the empty area within the resource. For example, since the empty area is quantized on the 1RB unit basis when the granularity is 1, the number of the signaling bits is 3 when the empty RB number is 8. However, when the empty RB number is 16, the number of the signaling bits becomes 4, that is, the number of the signaling bits exceeds the upper limit of the signaling bits explained in the second embodiment. In this third embodiment, the granularity (quantization unit) is set according to the empty RB number.

Figure 10:
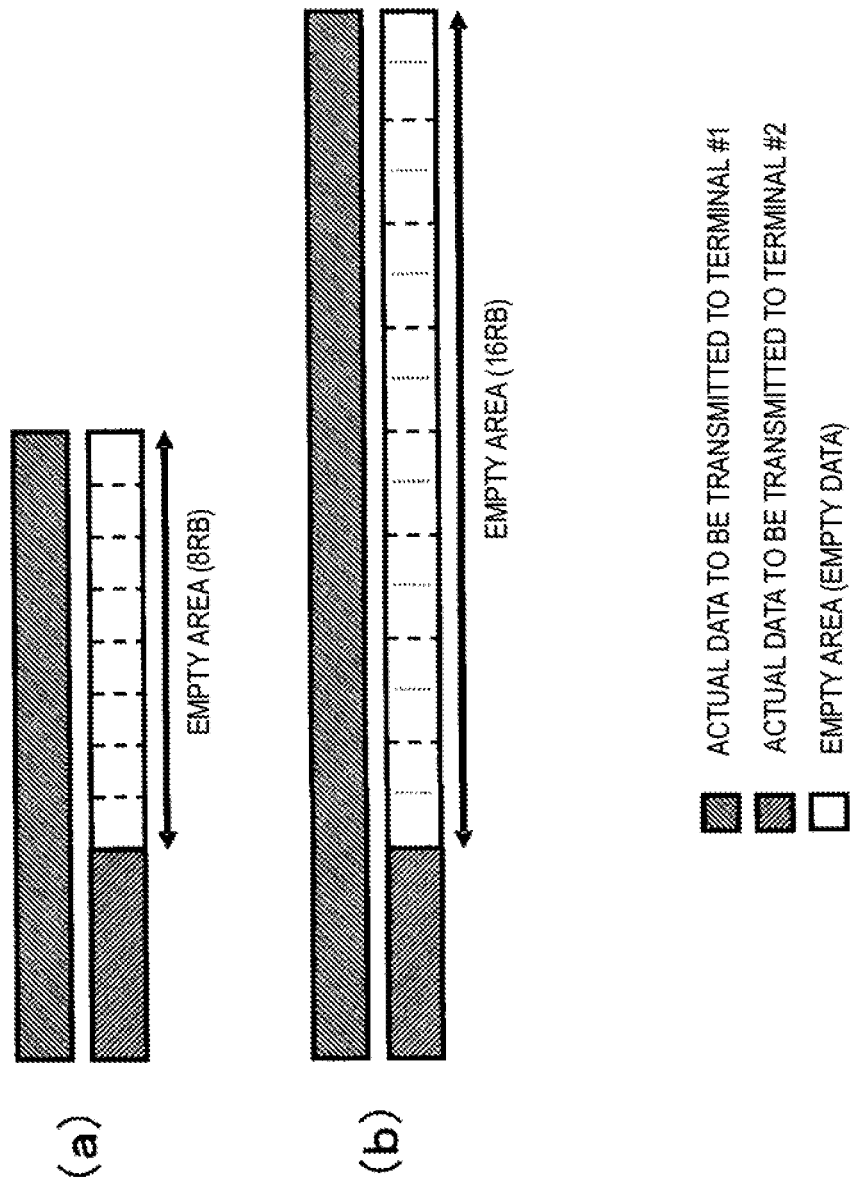

FIGS. 10(a) and 10(b) show a relation between the empty RB number and the granularity in a case where the upper limit of the number of the signaling bits is 3. FIG. 10(a) is a conceptual diagram at the time of quantizing 8 empty RBs by the granularity 1. FIG. 10(b) is a conceptual diagram at the time of quantizing 16 empty RBs by the granularity 2. As shown in FIG. 10(b), when the 16 empty RBs are quantized by the granularity 1, the number of the signaling bits becomes 4, which exceeds the upper limit thereof. Thus, in this embodiment, the unit at the time of quantizing the 16 empty RBs is set to 2RBs and the granularity is set to 2, whereby the number of the signaling bits is suppressed to 3. FIG. 11 is a diagram showing a relation between the RB number and the empty RB number of the terminal #2 and the signaling bits representing the redistribution pattern.

In this manner, according to the third embodiment, the granularity (quantization unit) of the signaling bits is set according to the empty RB number so as not to exceed the upper limit of the signaling bits. Thus, even when the empty RB number exceeds the optimum empty RB number, at which the improved gain of the average SINR characteristics explained in the second embodiment becomes maximum, the redistribution pattern can be represented by the upper limit of the signaling bits.

Although each of the above-described embodiments is explained as to the case where the multiplexed number is 2, the multiplexed number may be 3 or more. Further, in each of the above-described embodiments, although the MU-MIMO system has been explained as an example of the transmission system of the downlink, the SU-MIMO (SingleUser=MIMO) system may be employed, for example. In this case, the data to be multiplexed in the base station is a plurality of different data to be transmitted to a single terminal via a plurality of propagation channels. Further, in each of the above-described embodiments, although the pilot symbols of the respective terminals to be multiplexed are adjacent to each other on the time axis or the frequency axis, these pilot symbols may not be adjacent to each other but may be located in the vicinity to each other. Furthermore, the number of the pilot symbols may differ between the respective terminals. In this case, there may be a case that the pilot symbols of the plural terminals exist in the vicinity of a pilot symbol, whilst the pilot symbols of the plural terminals do not exist in the vicinity of a pilot symbol.

Further, the base station may notify the RB number of the terminal #1 via the individual channel of the terminal #2. This is because since the terminal #2 can obtain its own RB number from the individual control channel, this terminal can obtain the empty RB number by obtaining the RB number of the terminal #1 from the individual control channel destined thereto and calculating a difference thereof.

Further, in the case of using a common control channel, the base station may notify the RB number of the terminal #1 as the control data. This is because since the terminal #2 can obtain its own RB number from the individual control channel, this terminal can obtain the empty RB number by obtaining the RB number of the terminal #1 from the common control channel and calculating a difference thereof. When this method is employed, it is not necessary to consider any additional signaling with respect to the existing system.

Further, in each of the above-described embodiments, although the reason of the generation of the empty RBs is explained only as to the case where the data size differs between the terminals, the empty RBs are also generated even in a state that there exists no terminal to which data is distributed, for example. In such the case, the data redistribution explained above can also be applied.

In each of the above-described embodiments, although the explanation is made as to the case where this invention is configured by the hardware, it is also possible to configure this invention by the software.

Further, each of the functional blocks used for the explanation of each of the above-described embodiments is typically realized by an LSI as an integrated circuit. These functional blocks may be individually formed as single chips. Alternatively, a part or all of these functional blocks may be formed as a single chip. In this case, although the integrated circuit is referred as the LSI, it is also called as an IC, a system LSI, a super LSI or an ultra LSI depending on an integration degree thereof.

Further, the method of realizing the integrated circuit is not limited to the LSI but the integrated circuit may be realized by a dedicated circuit or a general-purpose processor. The integrated circuit may be realized by utilizing an FPGA (Field Programmable Gate Array) programmable after manufacturing an LSI or a reconfigurable processor capable of reconfiguring the connections or settings of circuit cells within an LSI.

Further, when another technique of forming an integrated circuit in place of an LSI is realized according to the progress of the semiconductor technique or another technique derived therefrom, the functional blocks may be integrated by utilizing such the technique, of course. Such the technique may be realized by applying the biotechnology, for example.

Although this invention is explained in detail with reference to the particular exemplary embodiments, it will be apparent for those skilled in the art that various changes and modifications are possible without departing from the spirit and range of this invention.

The present application is based on Japanese Patent Application (Japanese Patent Application No. 2010-046773) filed on Mar. 3, 2010, the contents of which are incorporated herein by reference.

INDUSTRIAL APPLICABILITY

The wireless communications device according to this invention is useful as a base station etc. for sufficiently utilizing the function of all the pilot symbols.

REFERENCE SIGNS LIST 101 scheduling section
103 empty resource block detection section (empty RB detection section)
105 redistribution pattern determination section
107 control data generation section
109 control data encoding section
111 control data modulation section
113 encoding section
115 modulation section
117 data distribution section
119 data redistribution section
121 MIMO multiplexing section
123 OFDM modulation section
125 feedback data demodulation section (FB data demodulation section)
127 feedback data decoding section (FB data decoding section)
201 OFDM modulation section
203 line estimation section
205 line quality measurement section
207 MIMO separation section
209 redistribution data return section
211 distribution data return section
213 demodulation section
215 decoding section
217 feedback data generation section (FB data generation section)
219 feedback data encoding section (FB data encoding section)
221 feedback data modulation section (FB data modulation section)
223 control data demodulation section
225 control data decoding section

The invention claimed is:

1. A wireless communications device that transmits a multiplexed signal of a plurality of data sets of different sizes to a communications terminal, comprising:
an empty resource block detection section that detects empty resource blocks containing no data among the plurality of data sets to which a predetermined number of resource blocks are allocated in a time direction and a frequency direction;
a data redistribution section that redistributes a part of the data that is distributed in the resource blocks to the empty resource blocks that are adjacent to pilot symbols for improving channel estimation accuracy disposed within the empty resource blocks; and
a Multi Input Multi Output (MIMO) multiplexing section that performs multiplexing of the plurality of data sets of different sizes to be transmitted to the communication terminal,
wherein the data redistribution section preferentially selects the data of the resource element in the order of that most away from the pilot symbol in the frequency direction when the channel variation in the frequency direction is larger than the channel variation in the time direction;
wherein the data redistribution section preferentially selects the data of the resource element in the order of that most away from the pilot symbol in the time direction when the channel variation in the time direction is larger than the channel variation in the frequency direction; and wherein the data redistribution section preferentially redistributes data, among the data distributed in the resource blocks, starting with the data that is furthest in the time direction or in the frequency direction from the pilot symbol disposed in the resource blocks to a position adjacent to the pilot symbol.

2. The wireless communications device according to claim 1, further comprising:
  a redistribution pattern determining section that determines a redistribution pattern of the data based on the number of resource blocks allocated to each of the plurality of data sets and the number of empty resource blocks detected by the empty resource block detection section,
  wherein the data redistribution section redistributes the data in accordance with the redistribution pattern determined by the redistribution pattern determining section.

3. The wireless communications device according to claim 1, wherein the pilot symbols are disposed at a constant interval in the time direction or the frequency direction in each of the predetermined number of resource blocks; and
  wherein the pilot symbols allocated to each of the plurality of data sets are disposed at positions adjacent to each other in the time direction and the frequency direction.

4. The wireless communications device according to claim 2, wherein an upper limit of signaling bits representing the redistribution pattern is set to an optimal number at which a maximum improvement of an average signal-to-interference and noise power ratio ("SINR") due to improved channel estimation accuracy is attained by utilizing the pilot symbols disposed in the empty resource block to improve channel estimation accuracy, and a minimum degradation of the average SINR due to an increase of an electric power loss based on an increase of the number of signaling bits is achieved.

5. The wireless communications device according to claim 4, wherein the number of the signaling bits representing the redistribution pattern is changed based on the number of the empty resource blocks.

6. The wireless communications device according to claim 1, wherein the wireless communications device transmits the multiplexed signal of the plurality of data sets to a plurality of communications terminals in a spatial multiplexing manner; and
  wherein each of the plurality of data sets is data to be transmitted to each of the plurality of communications terminals.

7. A data redistribution method performed by a wireless communications device that transmits a multiplexed signal of a plurality of data sets of different sizes to a communications terminal, comprising the steps of:
  detecting empty resource blocks containing no data among the plurality of data sets to which a predetermined number of resource blocks are allocated in a time direction and a frequency direction;
  selecting the data of the resource element, preferentially in the order of that most away from the pilot symbol in the frequency direction when the channel variation in the frequency direction is larger than the channel variation in the time direction;
  selecting the data of the resource element, preferentially in the order of that most away from the pilot symbol in the time direction when the channel variation in the time direction is larger than the channel variation in the frequency direction;
  redistributing a part of the data that is distributed in the resource blocks to the empty resource blocks that are adjacent to pilot symbols for improving channel estimation accuracy disposed within the empty resource blocks, preferentially starting with the data that is furthest in the time direction or in the frequency direction from the pilot symbol disposed in the resource blocks to a position adjacent to the pilot symbol; and
  multiplexing the plurality of data sets of different sizes to be transmitted to the communication terminal.

* * * * *